United States Patent
Kim et al.

(10) Patent No.: US 7,207,792 B2
(45) Date of Patent: Apr. 24, 2007

(54) EXPANSION TUBE HAVING EXPANSION SLITS AND APPARATUS FOR MANUFACTURING HEAT SHRINKABLE TUBE HAVING THE EXPANSION TUBE

(75) Inventors: Seon Tae Kim, Seoul (KR); Tae Jung Lee, Gyeonggi-do (KR)

(73) Assignee: LG Cable Ltd., Seoul (KR)

( * ) Notice: Subject to any disclaimer, the term of this patent is extended or adjusted under 35 U.S.C. 154(b) by 376 days.

(21) Appl. No.: 10/807,690

(22) Filed: Mar. 24, 2004

(65) Prior Publication Data
US 2004/0191351 A1    Sep. 30, 2004

(30) Foreign Application Priority Data
Mar. 29, 2003  (KR) ............ 10-2003-0019809

(51) Int. Cl.
B28B 21/92    (2006.01)
(52) U.S. Cl. ............ 425/392; 425/384; 425/387.1; 425/403.1
(58) Field of Classification Search ............ 425/387.1, 425/382, 384, 392, 403.1
See application file for complete search history.

(56) References Cited
U.S. PATENT DOCUMENTS

| | | | |
|---|---|---|---|
| 3,990,828 A * | 11/1976 | Reifenhauser | ............ 425/326.1 |
| 4,419,304 A | 12/1983 | Ficke et al. | |
| 4,441,694 A | 4/1984 | Currant et al. | |
| 4,896,904 A | 1/1990 | Gadsden et al. | |
| 5,071,886 A * | 12/1991 | Aoshima et al. | ............ 521/89 |
| 5,287,894 A | 2/1994 | Shukushima et al. | |
| 5,516,270 A * | 5/1996 | Lehtinen | ............ 425/71 |
| 6,162,383 A | 12/2000 | Hane et al. | |
| 6,863,856 B1 * | 3/2005 | Mahoney et al. | ............ 264/231 |

* cited by examiner

Primary Examiner—James P. Mackey
Assistant Examiner—Maria Veronica Ewald
(74) Attorney, Agent, or Firm—Thomas R. FitzGerald, Esq.; Hiscock & Barclay, LLP (57) ABSTRACT

The present invention relates to an expansion tube that has a plurality of expansion slits on the outer peripheral surface thereof long a longitudinal direction, each of the expansion slits having a predetermined width and a relatively larger length than the predetermined width, and an apparatus for manufacturing a heat shrinkable tube, having the expansion tube, that can regularly and fast expand the heat shrinkable tube, and after the expansion, regularly and fast cool the heat shrinkable tube by the cooling water sprayed through the slits, thereby rapidly and stably manufacturing the heat shrinkable.

16 Claims, 8 Drawing Sheets

FIG. 1

PRIOR ART

FIG. 2

PRIOR ART

FIG. 3

PRIOR ART

EXPANSION TUBE HAVING EXPANSION SLITS AND APPARATUS FOR MANUFACTURING HEAT SHRINKABLE TUBE HAVING THE EXPANSION TUBE

CROSS-REFERENCE TO RELATED APPLICATIONS

This application claims the benefit of the filing date of Korean Patent Application Number 10-2003-0019809, filed Mar. 29, 2003.

BACKGROUND OF THE INVENTION

1. Field of the Invention

The present invention relates to an expansion tube for manufacturing a heat shrinkable tube, and more particularly, to an expansion tube with a plurality of expansion slits formed thereon and an apparatus for manufacturing a heat shrinkable tube having the expansion tube, whereby the linear velocity of expansion of the heat shrinkable tube can be substantially increased, the cooling efficiency of the heat shrinkable tube can be enhanced, the friction of the heat shrinkable tube against the expansion tube can be substantially reduced, and the deviation of elongation of the heat shrinkable tube after expansion can be greatly lowered.

2. Background of the Related Art

Generally, a heat shrinkable tube is a product that is made of a polymeric synthetic resin that shrinks to a predetermined percentage if it is heated. The heat shrinkable tube is made of a thermoplastic polymeric synthetic resin that is composed of molecules that are long and thin, arranged in irregular fashions. Especially, crystals are formed between the two adjacent molecules to each other, which provides a force of coupling between them to the molecules.

The thermoplastic material is changed in shape if heated, but it is still kept in the changed shape once if cooled. That is to say, if the thermoplastic material is cooled after heating, it has got the crystals regenerated. Thus, when the crystals regenerated are processed by the irradiation with a high energy of radiation, permanent crosslinking is provided between the adjacent molecules. The crosslinked material is generally flexible and even if it is heated at a temperature over a melting point of the crystals, it is not melt and changed only in shape.

Specifically, the crosslinked tube has an elastic memory property with which it can remember its original shape before the change. In accordance with the types of product, thus, the heat shrinkable tube having the elastic memory shrinks in a radial direction to a range of 25% to 75% and shrinks in a longitudinal direction to a range of 10% or less.

Such the heat shrinkable tube is adapted to the product to be manufactured, for the purpose of being used in the applications where the electrical insulation or corrosion protection is required.

Figure 1:
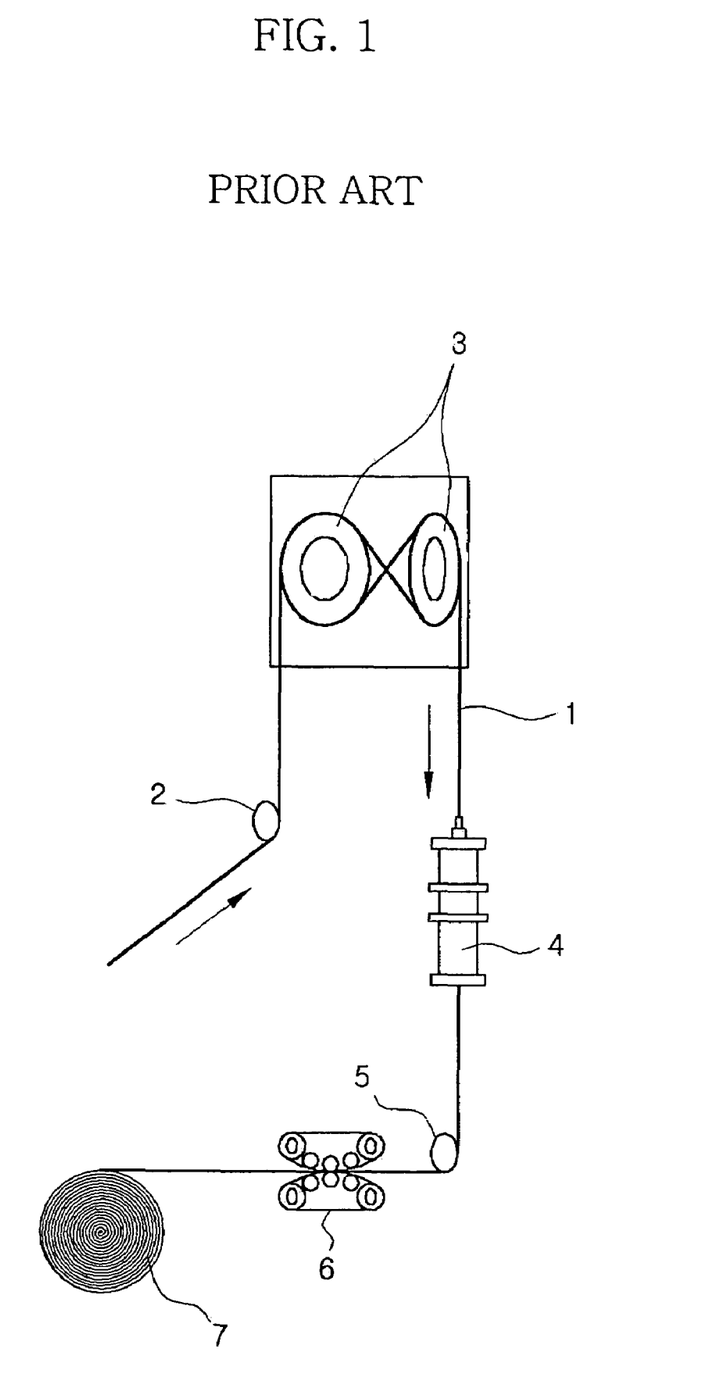
FIG. 1 is a schematic view of a conventional apparatus for manufacturing a heat shrinkable tube.

FIG. 1 is a schematic view of a conventional apparatus for manufacturing a heat shrinkable tube, wherein the apparatus includes a denser 2 that is adapted to receive a heat shrinkable tube 1, while preventing the heat shrinkable tube 1 from being loose, dry heating rolls 3 that are adapted to heat the heat shrinkable tube 1 ejected from the denser 2, an expansion chamber 4 that is adapted to expand the heat shrinkable tube 1 ejected from the dry heating rolls 3, a guide roller 5 that is adapted to guide the heat shrinkable tube 1 ejected from the expansion chamber 4 to a predetermined direction, a caterpillar 6 that is adapted to have the heat shrinkable tube 1 constant in diameter, and a bobbin 7 that is adapted to wind the heat shrinkable tube 1 ejected from the caterpillar 6.

The denser 2 serves to prevent the heat shrinkable tube 1 from being loose by the use of the dry heating rolls 3 before the expansion of the tube and also keeps the tube 1 from being cut.

The dry heating rolls 3 are disposed to heat the heat shrinkable tube 1 after passing the denser 2 to a predetermined temperature, such that the heat shrinkable tube 1 can be placed to be changeable in shape. Next, the heat shrinkable tube 1 is moved to the expansion chamber 4.

Figure 2:
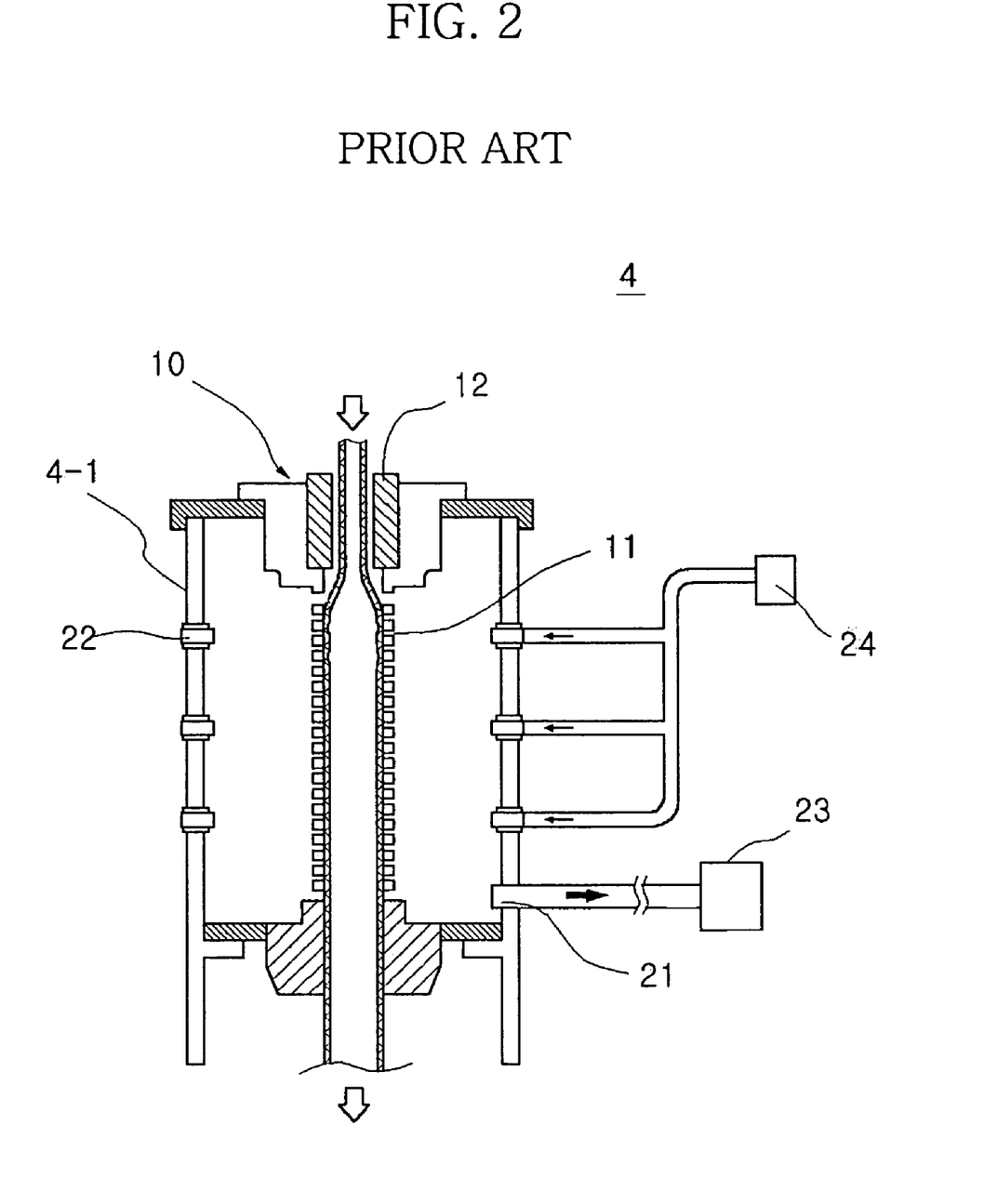
FIG. 2 is a sectional view of the conventional expansion chamber employed for manufacturing the heat shrinkable tube.

FIG. 2 is a sectional view of the conventional expansion chamber 4 employed for manufacturing the heat shrinkable tube 1. The expansion chamber 4 includes a given size of hollow body 4-1, an expansion tube 10 having a plurality of substantially circular expansion holes 11 regularly arranged in a lengthwise direction on the outer peripheral surface thereof, being contacted with the heat shrinkable tube 1 coming through a Teflon adapter 12, a plurality of cooling water nozzles 22 disposed on the surface of the body 4-1, for spraying cooling water through the plurality of expansion holes 11 such that the heat shrinkable tube 1 becomes cooled, a cooling water pump 24 for supplying the cooling water to the plurality of cooling water nozzles 22, a vacuum suction hole 21 disposed on the surface of the body 4-1, for discharging the air in the expansion tube 10 through the plurality of expansion holes 11 and the air in the body 4-1 to the outside of the expansion chamber 4, and a vacuum pump 23 connected to the vacuum suction hole 21, for discharging the air in the expansion chamber 4 to the outside.

Figure 3:
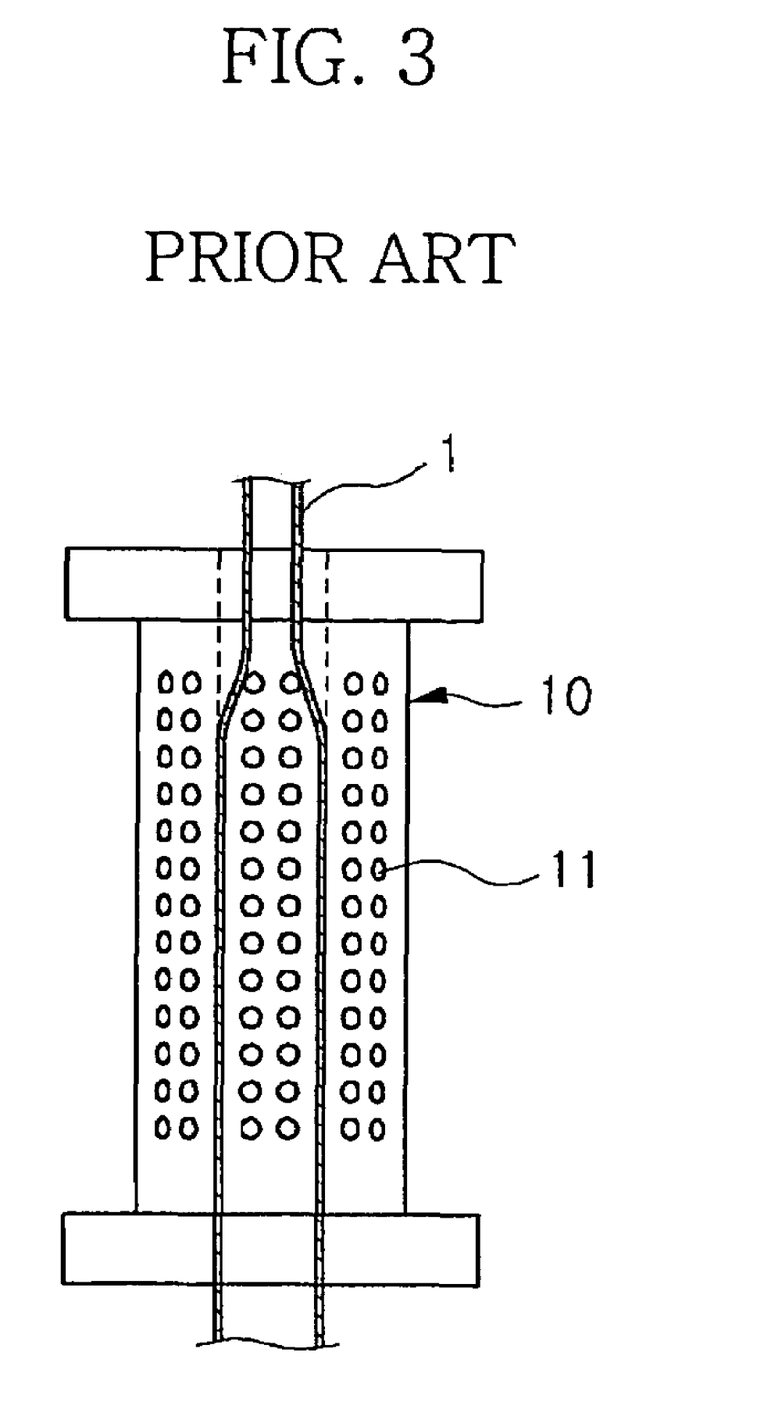
FIG. 3 is a front view of the conventional expansion tube of FIG. 1.

FIG. 3 is a front view of the conventional expansion tube 10. The expansion tube 10 is provided with the plurality of substantially circular expansion holes 11 regularly arranged on the outer peripheral surface thereof along a longitudinal direction. The heat shrinkable tube 1 that is passed through the Teflon adapter 12 is placed under a uniform environment in the expansion tube 10.

An explanation of the steps of processing the heat shrinkable tube 1 through the expansion tube 10 under the aforementioned construction is given in more detail.

First, the heat shrinkable tube 1 is heated to a temperature range from 120° C. to 250° C. through the dry heating rolls 3 and then, it is moved into the expansion tube 10 through the Teflon adapter 12. In this case, there is a space in which a small amount of air flows out between the Teflon adapter 12 and the heat shrinkable tube 1 such that the heat shrinkable tube 1 is moved into the expansion tube 10, not being directly contacted with the Teflon adapter 12.

When the heat shrinkable tube 1 is moved into the expansion tube 10, the air in the expansion chamber 4 is discharged to the outside through the vacuum suction hole 21 connected with the vacuum pump 23, which causes the pressure in the expansion chamber 4 to be lowered. When the air in the expansion chamber 4 is sucked through the vacuum pump 23, the air in the expansion tube 10 is evenly discharged through the plurality of expansion holes 11 such that the heat shrinkable tube 1 in the expansion tube 10 is expanded to larger radius than that before moved into the expansion tube 10.

At that time, when the cooling water nozzles 22 disposed on the surface of the body 4-1 are operated to cool the heat shrinkable tube 1 whose radius is enlarged, the cooling water is supplied from the cooling water pump 24 and sprayed into the expansion chamber 4. The sprayed cooling water comes into the expansion tube 10 via the plurality of expansion holes 11 and is applied to the outer peripheral surface of the expanded heat shrinkable tube 1. Thus, the heat shrinkable tube 1 becomes cooled in the state of being enlarged in radius.

The heat shrinkable tube 1 after cooling is moved out of the expansion chamber 4 and is wound on the bobbin 7 through the guide roller 5 and the caterpillar 6.

However, each of the expansion holes 11 of the conventional expansion tube 10 is circular in shape and small in size, as shown in FIG. 3, so that the linear velocity of expansion of the heat shrinkable tube 1 is relatively slow, which makes the time of manufacturing the product substantially extended. On the other hand, in case of making the linear velocity of expansion of the heat shrinkable tube high, the cooling water fails to completely cool the expanded heat shrinkable tube. Therefore, the heat shrinkable tube 1 takes an irregular shape.

To solve the problems, there is provided an expansion tube that has relatively large expansion holes, but when the air in the expansion camber is discharged by means of the vacuum pump, the portion of the heat shrinkable tube that is placed in each of the large expansion holes is expanded outwardly more than the inner peripheral surface of the expansion tube over the expansion hole such that the expanded heat shrinkable tube becomes irregular on surface. Therefore, the expansion tube exhibits a high cooling effect to the heat shrinkable tube but when the heat shrinkable tube is finally made, it gets the irregular heat shrinkable tube.

SUMMARY OF THE INVENTION

Accordingly, the present invention has been made to overcome the above-mentioned problems occurring in the prior art.

An object of the present invention is to provide an expansion tube that is capable of expanding and cooling a heat shrinkable tube in a manner of making the heat shrinkable tube substantially regular on the surface and at a substantially fast speed.

Another object of the present invention is to provide an apparatus for manufacturing a heat shrinkable tube having an expansion tube that is capable of expanding and cooling the heat shrinkable tube in a manner of making the heat shrinkable tube substantially regular on the surface and at a substantially fast speed.

According to an aspect of the present invention, there is provided an expansion tube having a plurality of expansion slits formed on the outer peripheral surface thereof along a longitudinal direction, each of the expansion slits having a predetermined width and a relatively larger length than the predetermined width.

According to another aspect of the present invention, there is provided an apparatus for manufacturing a heat shrinkable tube having an expansion tube, that includes a denser that is adapted to receive a heat shrinkable tube, while preventing the heat shrinkable tube from being loose, dry heating rolls that are adapted to heat the heat shrinkable tube ejected from the denser, an expansion chamber that is adapted to expand the heat shrinkable tube ejected from the dry heating rolls, a caterpillar that is adapted to have the heat shrinkable tube constant in diameter, and a bobbin that is adapted to wind the heat shrinkable tube ejected from the caterpillar.

According to the present invention, the expansion chamber includes the expansion tube in which the heat shrinkable tube is expanded to predetermined radius, a vacuum pump for discharging the air in the expansion tube, a cooling water pump for supplying cooling water to the expansion tube, a plurality of cooling water nozzles for spraying cooling water supplied from the cooling water pump, and a vacuum suction hole disposed between the wall surface of a body of the expansion chamber and the vacuum pump, for discharging the air in the expansion tube to the outside of the expansion chamber.

According to the present invention, the expansion tube has a plurality of expansion slits formed on the outer peripheral surface thereof along a longitudinal direction, each of the expansion slits having a predetermined width and a relatively larger length than the predetermined width.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Reference will now be made in detail to the preferred embodiments of the present invention, examples of which are illustrated in the accompanying drawings.

Figure 4:
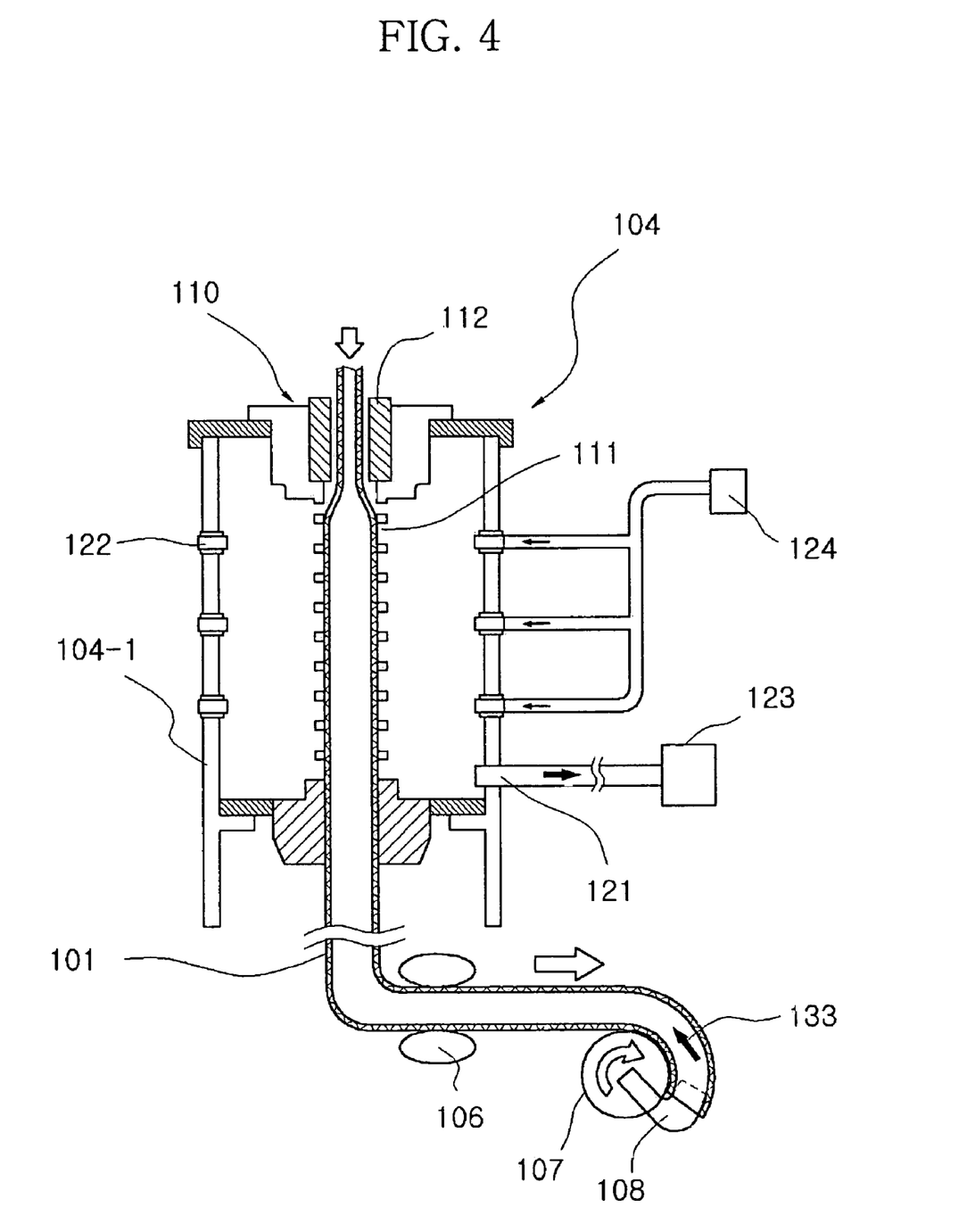
FIG. 4 is a sectional view of an apparatus for manufacturing a heat shrinkable tube according to the present invention.

FIG. 4 is a sectional view of an apparatus for manufacturing a heat shrinkable tube according to the present invention. The apparatus of the present invention includes a denser (which is not shown in the drawing) that is adapted to receive a heat shrinkable tube 101, while preventing the heat shrinkable tube 101 from being loose, dry heating rolls (not shown) that are adapted to heat the heat shrinkable tube 101 ejected from the denser, an expansion chamber 104 that is adapted to expand the heat shrinkable tube 101 ejected from the dry heating rolls, a caterpillar 106 that is adapted to have the heat shrinkable tube 101 constant in diameter, and a bobbin 107 that is adapted to wind the heat shrinkable tube 101 ejected from the caterpillar 106.

The expansion chamber 104 is provided with an expansion tube 110 in which the heat shrinkable tube 101 is expanded to predetermined radius, a vacuum pump 123 for discharging the air in the expansion tube 110, a cooling water pump 124 for supplying cooling water to the expansion tube 110, a plurality of cooling water nozzles 122 for spraying cooling water supplied from the cooling water pump 124, and a vacuum suction hole 121 disposed between the wall surface of a body 104-1 of the expansion chamber 104 and the vacuum pump 124, for discharging the air in the expansion tube 110 to the outside of the expansion chamber 104.

The expansion tube 110 is provided with a plurality of expansion slits 111a formed on the outer peripheral surface thereof in a longitudinal direction, each of the expansion slits 111a having a predetermined width W and a relatively larger length H than the predetermined width W.

In the above, the apparatus for manufacturing the heat shrinkable tube according to the present invention further comprises pressure control means for controlling the pressure in the expansion chamber 104.

Moreover, the apparatus for manufacturing the heat shrinkable tube according to the present invention comprises cooling water temperature control means for controlling the temperature of the cooling water sprayed to the heat shrinkable tube 101.

The apparatus for manufacturing the heat shrinkable tube according to the present invention is further provided with a pressurizing tube 108 that is disposed around the bobbin 107 for applying air to the heat shrinkable tube 101 such that the heat shrinkable tube 101 is appropriately expanded in the expansion chamber 104 and with a compressor that is connected with the pressurizing tube 108 to which the air is supplied.

Figure 5A:
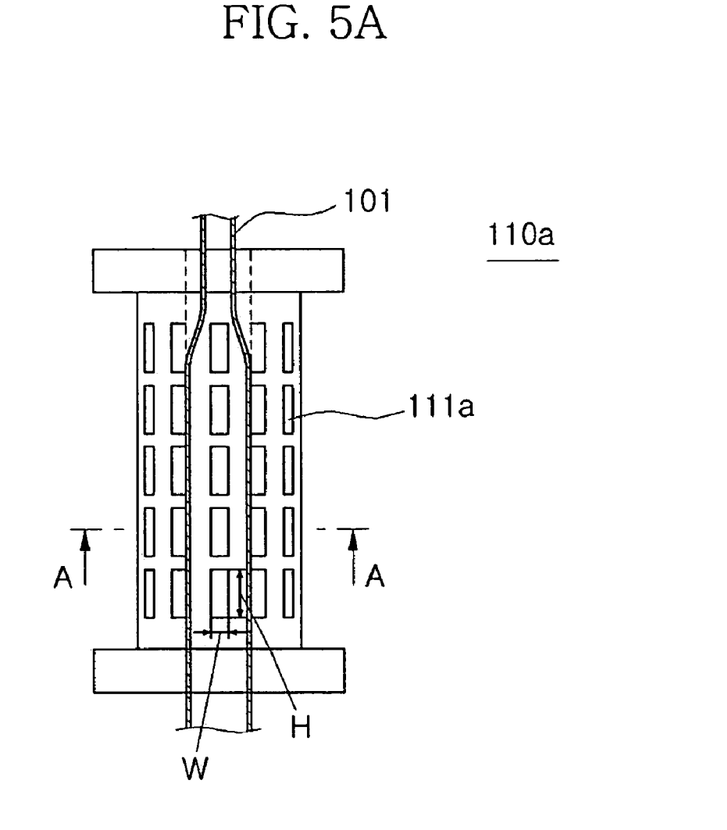
FIG. 5A is a front view of an expansion tube having a plurality of expansion slits according to a first embodiment of the present invention.
Figure 5B:
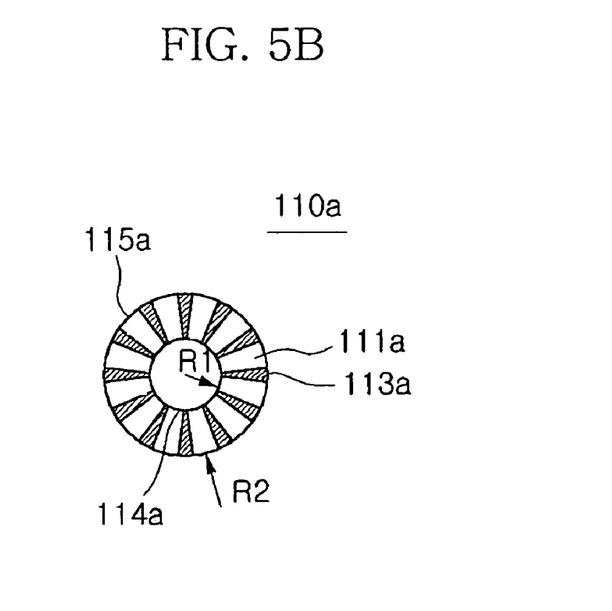
FIG. 5B is a sectional view taken along the line A—A of FIG. 5A.

FIG. 5A is a front view of an expansion tube having a plurality of expansion slits according to a first embodiment of the present invention, and FIG. 5B is a sectional view taken along the line A—A of FIG. 5A.

As shown in the figures, an expansion tube 110a according to the first embodiment of the present invention is provided with a plurality of generally rectangular expansion slits 111a (which are called simply 'expansion slits') each having a larger length along a longitudinal direction than a length in a circumference direction, with respect to the side of the expansion tube. That is to say, each of the expansion slits 111a has the length H substantially larger than the width W, which is in the generally rectangular shape. In this manner, the plurality of expansion slits 111a each having the length H substantially larger than the width W are arranged regularly on the outer peripheral surface of the expansion tube 110a along a longitudinal direction.

The larger the length H of each expansion slit 111a is, the larger the area of each expansion slit 111a becomes. Thereby, the cooling water is sprayed to very large areas of the heat shrinkable tube 101 through the expansion slits 111a such that the heat shrinkable tube 101 can be cooled in more efficient manner. Also, a degree of friction between the heat shrinkable tube 101 rapidly cooled and the inner peripheral surface of the expansion tube 110a can be reduced. So, the heat shrinkable tube 101 is not changed in shape well and also exhibits a substantially low elongation deviation.

In the above, since the area of each expansion slit 111a according to the first embodiment of the present invention is substantially larger than the area of each circular expansion hole in the prior art, the expansion tube of the present invention can have an excellent cooling efficiency, and since the expansion slit walls 113a in a vertical direction are positioned at substantially smaller intervals, there is no problem that the heat shrinkable tube is not expanded over the inner peripheral surface of the expansion tube through the expansion slits. In addition, the conventional expansion tube having the circular expansion holes does not exhibit regular expansion results, but the expansion tube having the rectangular expansion slits according to the present invention can apply a constant vacuum pressure to the heat shrinkable tube upon expansion, which ensures the stability of the expansion of the heat shrinkable tube. It is therefore appreciated that the expansion tube having the rectangular expansion slits according to the present invention is capable of expanding and cooling the heat shrinkable tube in a manner of making the heat shrinkable tube substantially regular on the surface and at a substantially fast speed.

According to the present invention, the length H and the width W of each expansion slit 111a are determined upon various factors, such as cooling effect, the elongation of heat shrinkable tube, or the production time that can be kept showing a constant quality. In this manner, preferably, the width W gets small and the length H gets long, if possible, which makes the surface area of the heat shrinkable tube sprayed by the cooling water enlarged such that in case of a high linear velocity of expansion, a substantially high cooling effect can be obtained and a degree of friction of the heat shrinkable tube against the inner peripheral surface of the expansion tube can be reduced.

In more detail, the width W of each of the expansion slits 111a is desirably in a range of 1 mm to 3 mm. If the width is smaller than 1 mm, the cooling efficiency becomes low, and if larger than 3 mm, the heat shrinkable tube is expanded over the inner peripheral surface of the expansion tube through the expansion slits and the degree of friction of the heat shrinkable tube against the expansion tube becomes high, thereby causing irregular expansion results.

Also, the length H of each of the expansion slits 111a is varied depending upon the outer diameter of the expanded heat shrinkable tube, but it desirably has a larger length in a range of 2.5 times to 5 times than the width W thereof. If the length H is smaller than 2.5 times, the cooling efficiency becomes low due to the small area of the expansion slit, and if larger than 5 times, the degree of friction of the heat shrinkable tube against the expansion tube becomes high, thereby causing irregular expansion results.

The interval of the adjacent left and right expansion slits is desirably the width W or less of each expansion slit with respect to the inner peripheral surface of the expansion tube, and the interval between the adjacent upper and lower expansion slits is desirably in a range of $\frac{1}{5}$ to $\frac{1}{1}$ of the length H of each expansion slit.

In the above, the expansion tube 110 of the present invention is desirably made of a metal material that has high wearing and heat resistances.

According to the first embodiment of the present invention, the expansion tube 110a having each expansion slit 111a is desirably formed in such a manner that a width of the expansion tube at inner radius R1 is the same as that of the expansion tube at outer radius R2, as shown in FIG. 5B, for the purpose of simply manufacturing the expansion tube. However, if the thickness of each expansion slit wall 113a is formed in the same manner as above, the procedure of manufacturing the expansion tube becomes very complicated.

In the above, the expansion slit walls 113a have the same thickness as one another preferably.

Figure 6A:
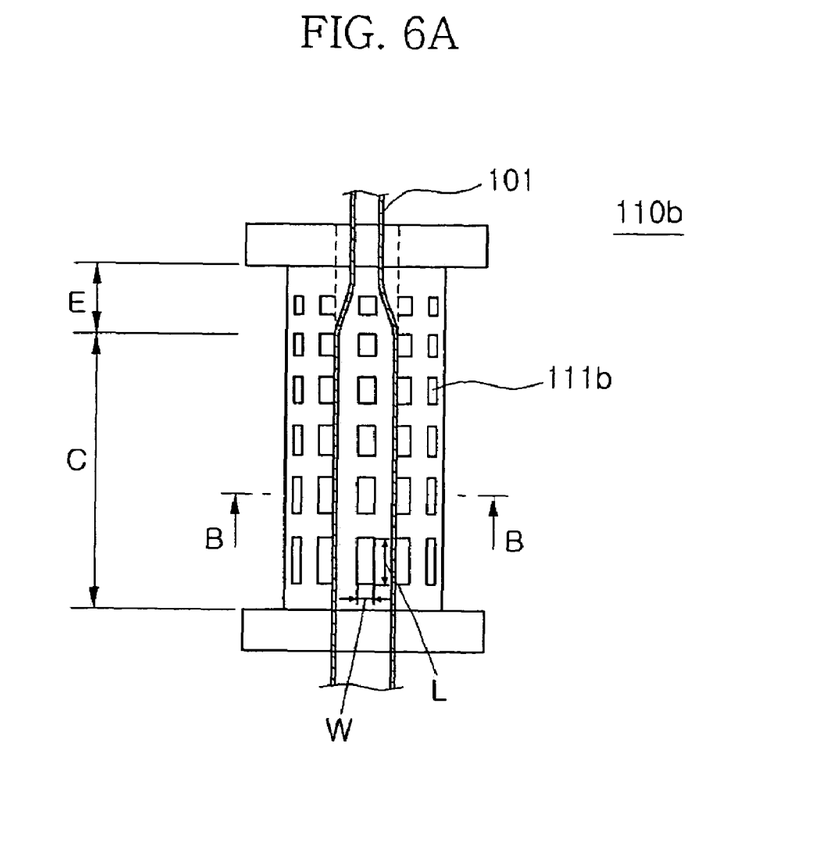
FIG. 6A is a front view of an expansion tube having a plurality of expansion slits according to a second embodiment of the present invention.
Figure 6B:
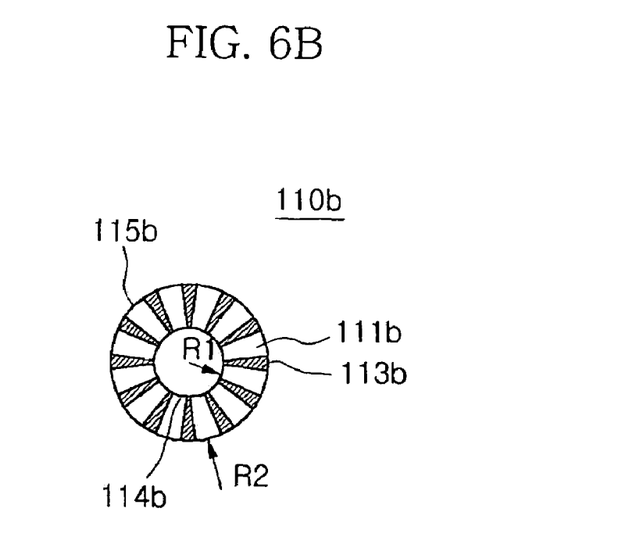
FIG. 6B is a sectional view taken along the line B—B of FIG. 6A.

FIG. 6A is a front view of an expansion tube having a plurality of expansion slits according to a second embodiment of the present invention, and FIG. 6B is a sectional view taken along the line B—B of FIG. 6A.

As shown in FIGS. 6A and 6B, an expansion tube 110b according to the second embodiment of the present invention is provided with a plurality of expansion slits 111b each having a length H increased along a direction to which the heat shrinkable tube 101 is manufactured. Under the above construction, the expansion tube 110b is divided into an expansion section E where the heat shrinkable tube 101 has an expansion rate larger than a cooling rate and a cooling section C where the expanded heat shrinkable tube is cooled. With the divided two sections, the heat shrinkable tube 101 can be carried out in more efficient expanding and cooling ways.

In the expansion section E, the air in the expansion chamber 104 and the expansion tube 110b is drawn to the outside by means of the vacuum pump 123, and the pressure in the expansion tube 110b becomes low such that the heat shrinkable tube 101 is rapidly expanded in the inner peripheral surface of the expansion tube 110b. When such the expanded heat shrinkable tube 101 is passed through the cooling section C, it is rapidly cooled by the cooling water that is being sprayed to the inner peripheral surface of the expansion tube 110b through the plurality of expansion slits 111b, at the state of being expanded in radius.

In more detail, the process of expanding the heat shrinkable tube gives an influence to the shape of the heat shrinkable tube 101 after expansion, and the process of cooling the heat shrinkable tube gives an influence to the modification of the heat shrinkable tube 101 after the shape is determined. When the heat shrinkable tube 101 is manufactured, it is important that the heat shrinkable tube 101 should be cooled in regular and fast after expanded in the regular and fast. In addition, the cooling efficiency is greatly varied in accordance with the size of the expansion slit, but the expanding efficiency is not varied like that.

So as to expand the heat shrinkable tube in the regular and fast manners, preferably, the length H of each expansion slit 111b is almost equal to the width W thereof in the expansion section E.

So as to cool the heat shrinkable tube in the regular and fast manners, to the contrary, the length H of each expansion slit 111b becomes larger than the width W thereof step by step along the length direction of the expansion tube 104 in the cooling section C such that the expanded heat shrinkable tube is applied with the cooling water in the area being gradually large, which makes the heat shrinkable tube cooled in the regular and fast manners.

Under the above-described principle, the expansion tube 110b according to the second embodiment of the present invention has the different sizes of expansion slits in the expansion section E and the cooling section C.

In the above, the width W of each of the expansion slits 111b is desirably in a range of 1 mm to 3 mm in both of the expansion section E and the cooling section C, in the same manner as the first embodiment of the present invention. If the width is smaller than 1 mm, the cooling efficiency becomes low, and if larger than 3 mm, the heat shrinkable tube is expanded over the inner peripheral surface of the expansion tube through the expansion slits and the degree of friction of the heat shrinkable tube against the expansion tube becomes high, thereby causing irregular expansion results.

Also, the length H of each of the expansion slits 111a is varied depending upon the outer diameter of the expanded heat shrinkable tube, but it desirably has a larger length in a range of 2.5 times to 5 times than the width W thereof in the expansion section E and a larger length in a range of 3.5 times to 10 times than the width W thereof in the cooling section C.

The interval of the adjacent left and right expansion slits is desirably the width W or less of each expansion slit with respect to the inner peripheral surface of the expansion tube, and the interval between the adjacent upper and lower expansion slits is desirably in a range of 1/5 to 1/1 of the length H of each expansion slit.

According to the second embodiment of the present invention, the expansion tube 110b having each expansion slit 111b is desirably formed in such a manner that a width of the expansion tube at inner radius R1 is the same as that of the expansion tube at outer radius R2 (see FIG. 6B), in the same manner as the first embodiment of the present invention, for the purpose of manufacturing the expansion tube in a simple manner.

In the above, the expansion slit walls 113b have the same thickness as one another preferably.

The apparatus of the present invention provided with the expansion tube having the expansion slits can apply vacuum pressure to the surface of the heat shrinkable tube at a substantially constant state upon expansion of the tube, which results in the stable expansion result.

Also, the contacting area between the tube and the cooling water upon the expansion is enlarged such that the cooling velocity of the heat shrinkable tube expanded can be substantially high and the friction between the tube and the inner peripheral surface of the expansion tube can be reduced, which ensures the more stable expansion result.

Figure 7A:
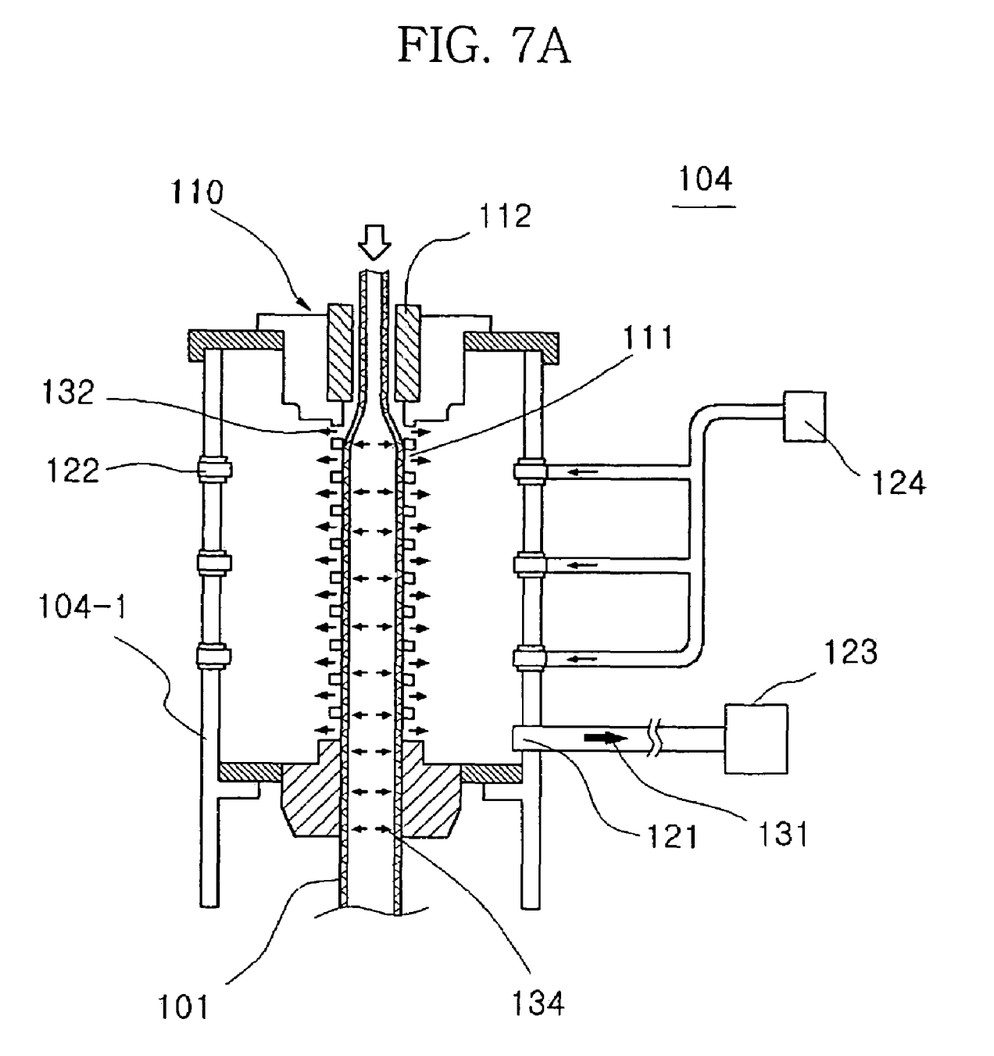
FIGS. 7A and 7B are sectional views showing the operations of the apparatus for manufacturing the heat shrinkable tube according to the present invention.
Figure 7B:
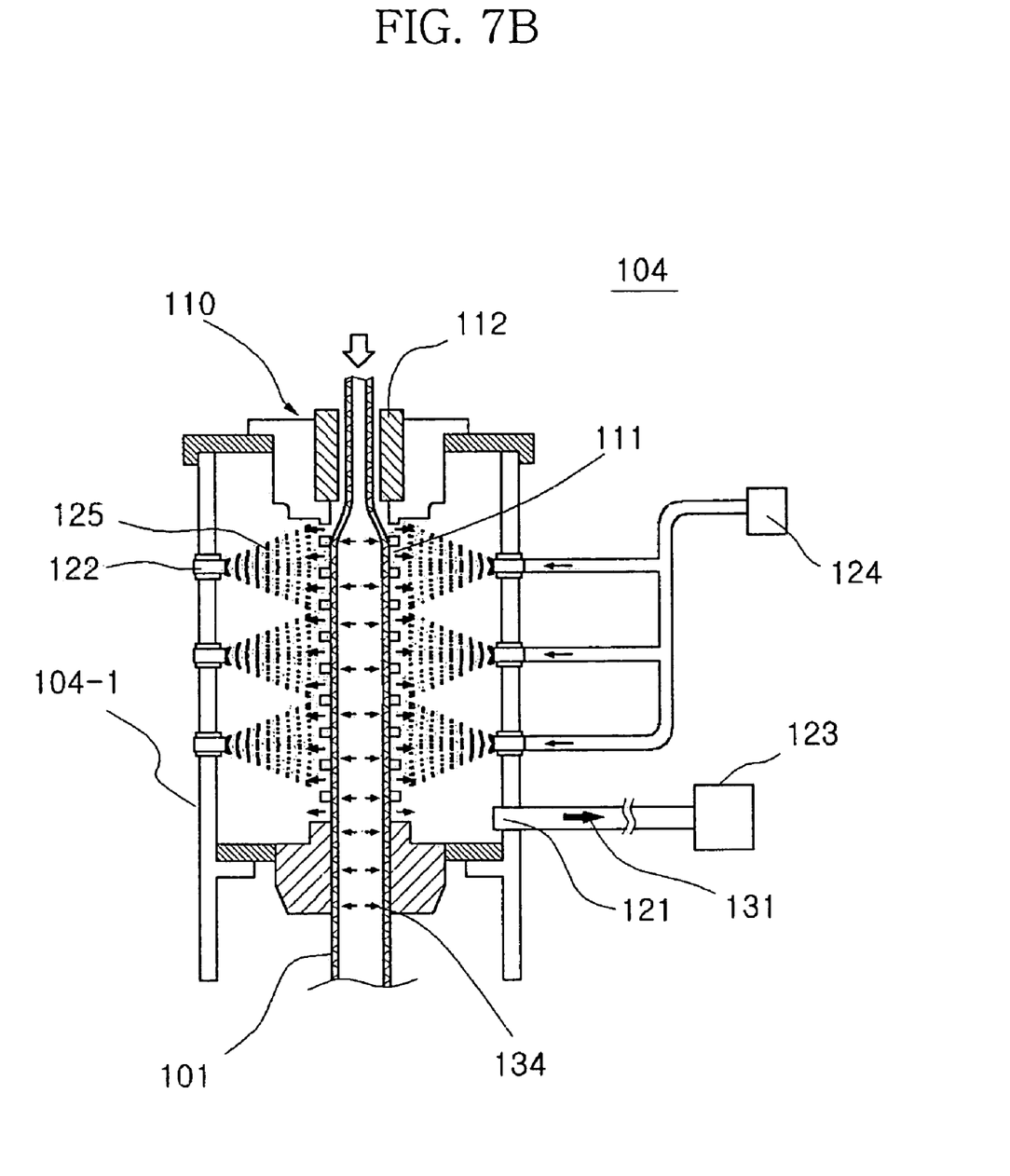

FIGS. 7A and 7B are sectional views showing the operations of the apparatus for manufacturing the heat shrinkable tube of the present invention.

As shown, the air in the expansion chamber 104 is discharged to the vacuum pump 123 along a direction to which a vacuum force 131 is advanced through the vacuum suction hole 121 on the wall surface of the body 104-1 thereof. At the same time, the air in the expansion tube 110 is discharged to the vacuum pump 123 along the direction to which the vacuum force 131 is advanced through the expansion slits 111 and the vacuum suction hole 121, by the action of suction forces 132 formed on the outer peripheral surface of the expansion tube 110. Therefore, the expansion tube 110 forms expansion forces 134 acting outwardly through the expansion slits 111, in the interior thereof, and the heat shrinkable tube 101 in the interior of the expansion tube is expanded toward the inner peripheral surface of the expansion tube 110 at the state of being heated to a predetermined temperature.

The expanded heat shrinkable tube 101 is moved along the length direction of the expansion tube 110 in the inner peripheral surface of the expansion tube 110.

At the same time, cooling water 125 is sprayed against the outer peripheral surface of the expansion tube 110 through the cooling water nozzles 122 and is applied to the expanded heat shrinkable tube 101 through the expansion slits 111. In other words, the cooling water 125 being sprayed from the cooling water nozzles 122 is dispersed in a circular shape and is applied into the expansion tube 110 through the expansion slits 111 in such a manner as to be continuously applied to the heat shrinkable tube 101 being moved through the inner peripheral surface of the expansion tube 110. Therefore, the heat shrinkable tube that is expanded at a high temperature is cooled by the application of the cooling water 125.

In this manner, each of the cooling water nozzles 122 is connected with the cooling water pump 124 pumping a predetermined temperature of cooling water. The cooling water pump 124 is adapted to pump the cooling water that is passed through a cooling water tank (which is not shown)

in which the cooling water is stored and a cooling water filter (which is not shown) through which the cooling water is filtered.

As appreciated from the above description, the apparatus for manufacturing the heat shrinkable tube, provided with the expansion tube having the expansion slits, can expand the heat shrinkable tube in the regular and fast manners, and after the expansion, cool the heat shrinkable tube by the cooling water sprayed through the expansion slits in the regular and fast manners, thereby manufacturing the heat shrinkable tube in rapid and stable manners.

The present invention will now be described in detail by way of a particular example.

EXAMPLE

To compare the performances between the expansion tube of the present invention and the conventional expansion tube, the heat shrinkable tube made by the use of the apparatus provided with the expansion tube according to the first embodiment of the present invention was compared in quality with that made by the use of the conventional expansion tube.

First of all, using the apparatus provided with the expansion tube according to the first embodiment of the present invention the heat shrinkable tube that has an outer diameter of 5 mm was heated up to a temperature of 120° C. and inserted into the expansion tube at a linear velocity of expansion of 20 m per minute. After that, the expansion and cooling processes were conducted at a vacuum pressure of 700 Torr, thereby completing the manufacturing of the heat shrinkable tube.

After the quality of heat shrinkable tube manufactured was checked, it was found that the deviation of ±5 mm with respect to the printing length of 200 mm occurred. The deviation of the printing length is a set value generally required in the quality of the manufactured heat shrinkable tube, and in this case, it was in a range of errors of ±3%.

It was also found that the expansion tube of the present invention had very low friction between the surface of the heat shrinkable tube and the inner peripheral surface of the expansion tube, such that the heat shrinkable tube was being produced for three hours or more.

On the other hand, using the conventional expansion tube the heat shrinkable tube was made under the same conditions as the present invention. As a result, it was found that the deviation of more than ±10 mm with respect to the printing length of 200 mm occurred. The deviation of the printing length is a set value generally required in the quality of the manufactured heat shrinkable tube, and in this case, it was out of a range of errors of ±3%.

It was therefore appreciated that the performance of the expansion tube of the present invention was more excellent than the performance of the conventional expansion tube.

As clearly described above, in case of manufacturing the heat shrinkable tube by using the apparatus provided with the expansion tube according to the preferred embodiments of the present invention, the heat shrinkable tube can be expanded at a substantially fast velocity and cooled in a substantially uniform surface, with great reduction of friction between the heat shrinkable tube and the expansion tube, thereby producing the heat shrinkable tube for long hours at faster and more stable manner than in the conventional practice.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. An expansion tube having a plurality of expansion slits formed along a longitudinal direction on the outer peripheral surface thereof, each of the expansion slits having a predetermined width and a relatively larger length than the predetermined width;
    wherein the plurality of expansion slits have lengths gradually increased along a direction to which the heat shrinkable tube is manufactured; and
    wherein each of the plurality of expansion slits has a larger length in a range of 2.5 times to 5 times than the width thereof in an expansion section and a larger length in a range of 3.5 times to 10 times than the width thereof in a cooling section.

2. An expansion tube according to claim 1, wherein each of the plurality of expansion slits is in a generally rectangular shape.

3. An expansion tube according to claim 1, wherein an interval of the adjacent left and right expansion slits is the width or less than each expansion slit with respect to the inner peripheral surface of the expansion tube.

4. An expansion tube according to claim 1, wherein an interval between the adjacent upper and lower expansion slits is in a range of ⅕ to ¼ of the length of each expansion slit.

5. An expansion tube according to claim 1, wherein the plurality of the expansion slits have the same intervals.

6. An expansion tube according to claim 1, wherein each of the plurality of expansion slits is in a generally rectangular shape.

7. An apparatus for manufacturing a heat shrinkable tube, having an expansion tube, comprising: a denser that is adapted to receive a heat shrinkable tube, while preventing the heat shrinkable tube from being loose; dry heating rolls that are adapted to heat the heat shrinkable tube ejected from the denser; an expansion chamber that is adapted to expand the heat shrinkable tube ejected from the dry heating rolls; a caterpillar that is adapted to have the heat shrinkable tube constant in diameter; and a bobbin that is adapted to wind the heat shrinkable tube ejected from the caterpillar, wherein the expansion chamber comprises the expansion tube in which the heat shrinkable tube is expanded to predetermined radius, a vacuum pump for discharging the air in the expansion tube, a cooling water pump for supplying cooling water to the expansion tube, a plurality of cooling water nozzles for spraying cooling water supplied from the cooling water pump, and a vacuum suction hole disposed between the wall surface of a body of the expansion chamber and the vacuum pump, for discharging the air in the expansion tube to the outside of the expansion chamber, and wherein the expansion tube has a plurality of expansion slits formed on the outer peripheral surface thereof along a longitudinal direction, each of the expansion slits having a predetermined width and a relatively larger length than the predetermined width;
    wherein an interval of the adjacent left and right expansion slits is the width or less of each expansion slit with respect to the inner peripheral surface of the expansion tube.

8. An apparatus for manufacturing a heat shrinkable tube according to claim 7, wherein each of the plurality of expansion slits is in a generally rectangular shape.

9. An apparatus for manufacturing a heat shrinkable tube according to claim 7, wherein each of the plurality of expansion slits has a width in a range of 1 mm to 3 mm.

10. An apparatus for manufacturing a heat shrinkable tube according to claim 7, wherein each of the plurality of expansion slits has a larger length in a range of 2.5 times to 5 times than the width thereof.

11. An apparatus for manufacturing a heat shrinkable tube according to claim 7, wherein an interval between the adjacent upper and lower expansion slits is in a range of 1/5 to 1/1 of the length of each expansion slit.

12. An apparatus for manufacturing a heat shrinkable tube according to claim 7, wherein the plurality of the expansion slits have the same intervals.

13. An apparatus for manufacturing a heat shrinkable tube according to claim 7, wherein the plurality of expansion slits have lengths gradually increased along a direction to which the heat shrinkable tube is manufactured.

14. An apparatus for manufacturing a heat shrinkable tube according to claim 13, wherein each of the plurality of expansion slits is in a generally rectangular shape.

15. An apparatus for manufacturing a heat shrinkable tube according to claim 13, wherein each of the plurality of expansion slits has a width in a range of 1 mm to 3 mm.

16. An apparatus for manufacturing a heat shrinkable tube according to claim 14, wherein each of the plurality of expansion slits has a larger length in a range of 2.5 times to 5 times than the width thereof in an expansion section and a larger length in a range of 3.5 times to 10 times than the width thereof in a cooling section.

* * * * *